Aug. 20, 1935.   L. GOLDHAMMER   2,011,895
PHOTOGRAPHIC CAMERA
Filed Oct. 23, 1934

Inventor:
Leo Goldhammer,
By Attorney
Philip S. Hopkins.

Patented Aug. 20, 1935

2,011,895

UNITED STATES PATENT OFFICE 2,011,895

PHOTOGRAPHIC CAMERA

Leo Goldhammer, Munich, Germany, assignor to Agfa Ansco Corporation, Binghamton, N. Y., a corporation of New York Application October 23, 1934, Serial No. 749,631
In Germany October 28, 1933

5 Claims. (Cl. 95—53)

My present invention relates to a photographic camera and more particularly to an extensible photographic camera not provided with a base board and having a shutter release lever which is free when the camera is in collapsed condition.

Figure 1:
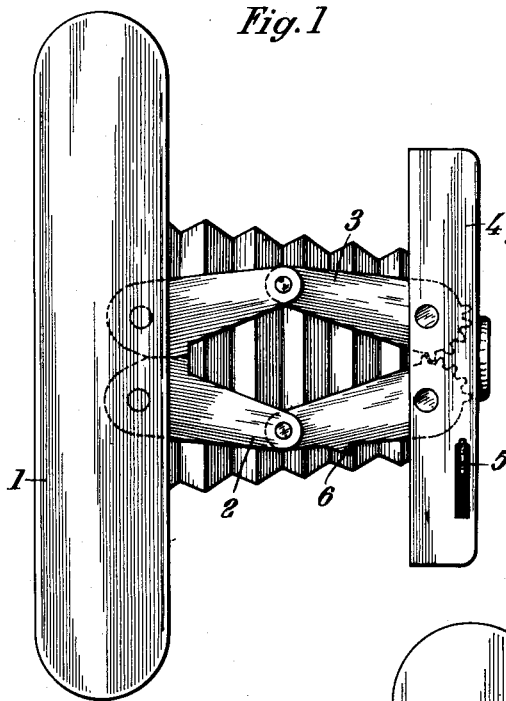
Figure 2:
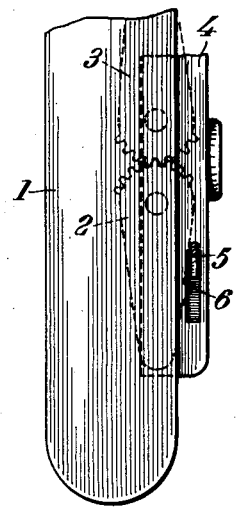
Figure 3:
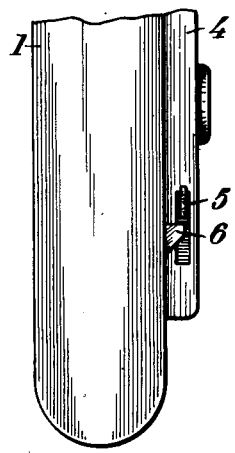
Figure 4:
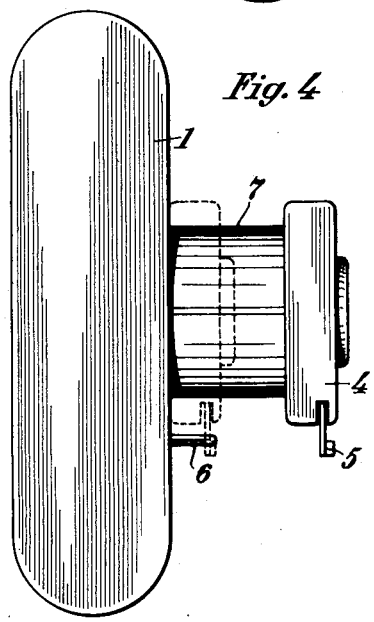

One of its objects is an improved camera of this type. Further objects will be seen from the detailed specification following hereafter. Reference is made to the accompanying drawing in which Fig. 1 shows in elevation a camera with a toggle extension device in extended position and provided with means for locking the release lever of the shutter when the camera is closed, Fig. 2 shows the camera of Fig. 1 in the closed position, Fig. 3 shows the camera of Fig. 1 provided with another means for locking the release lever of the shutter and Fig. 4 shows a camera with a tubular extension device provided with a means for locking the release lever of the shutter.

In extensible photographic cameras not provided with base boards (having tubular or lazy-tongs extension device) and having a shutter release lever which is free when the camera is in collapsed condition, it is possible, owing to inadvertence or in consequence of someone having tampered with the camera, for the shutter to be actuated unintentionally thus causing a false exposure of the film.

The invention avoids this drawback in a simple manner by providing a catch device which locks the release lever of the shutter when the camera is closed.

The invention will now be described with reference to the accompanying drawing.

The housing 1 of the camera is connected with the objective panel 4 by means of toggle members 2 and 3.

From the side of the objective panel 4 there protrudes the release lever 5 of the shutter. The shutter can be actuated when the objective is in the position for taking photographs (see Fig. 1), but when the panel 4 has been thrust back (see Fig. 2), the lever is locked by a projection 6 provided on the toggle member 2. In this position, therefore, the release lever 5 can no longer be moved downwards and thus false exposures are avoided. It is, of course, also possible to provide the projection 6 on the housing of the camera as shown in Fig. 3.

Fig. 4 shows the provision of the device according to this invention on camera in which the objective panel 4 is connected with the housing 1 of the camera by means of the tubular extension device 7. In this case the release lever 5 of the shutter is locked by the projection 6 mounted on the housing of the camera when the camera is in its closed position.

If the release lever is mounted in the camera housing (focal plane shutter) the retaining projection, which is held in the inoperative position by a spring, is brought into the locking position by the objective panel when the latter is thrust towards the housing.

What I claim is:

1. A photographic camera without a base board comprising in combination a camera casing, an objective panel, an extension device for connecting said objective panel with said camera casing, a shutter mounted in said objective panel, a lever protruding from said objective panel for releasing said shutter, and means for locking said lever when the camera is closed.

2. A photographic camera without a base board comprising in combination a camera casing, an objective panel, an extension device for connecting said objective panel with said camera casing, a shutter mounted in said objective panel, a lever protruding from said objective panel for releasing said shutter, and means arranged on said extension device for locking said lever when the camera is closed.

3. A photographic camera without a base board comprising in combination a camera casing, an objective panel, an extension device for connecting said objective panel with said camera casing, a shutter mounted in said objective panel, a lever protruding from said objective panel for releasing said shutter, and means arranged on said camera casing for locking said lever when the camera is closed.

4. A photographic camera without a base board comprising in combination a camera casing, an objective panel, toggle members for connecting said objective panel with said camera casing, a shutter mounted in said objective panel, a lever protruding from said objective panel for releasing said shutter, and a projection on one of said toggle members for locking said lever when the camera is closed.

5. A photographic camera without a base board comprising in combination a camera casing, an objective panel, a tubular extension device for connecting said objective panel with said camera casing, a shutter mounted in said objective panel with said camera casing, a shutter mounted in said objective panel, a lever protruding from said objective panel for releasing said shutter, and a projection on said camera casing for locking said lever when said camera is closed.

LEO GOLDHAMMER.